United States Patent
Flores et al.

(10) Patent No.: US 8,915,685 B2
(45) Date of Patent: Dec. 23, 2014

(54) STRAP CORNER PROTECTOR MULTIFUNCTIONAL INSTALLATION TOOL

(71) Applicants: Epifanio Reyes Flores, Orlando, FL (US); Ricardo Flores, Orlando, FL (US)

(72) Inventors: Epifanio Reyes Flores, Orlando, FL (US); Ricardo Flores, Orlando, FL (US)

(73) Assignee: Epifanio R. Flores, Orlando, FL (US)

( * ) Notice: Subject to any disclaimer, the term of this patent is extended or adjusted under 35 U.S.C. 154(b) by 0 days.

(21) Appl. No.: 14/255,795

(22) Filed: Apr. 17, 2014

(65) Prior Publication Data

US 2014/0311092 A1 Oct. 23, 2014

Related U.S. Application Data

(60) Provisional application No. 61/813,020, filed on Apr. 17, 2013.

(51) Int. Cl.
 B65B 13/18 (2006.01)
 B25F 1/00 (2006.01)

(52) U.S. Cl.
 CPC .............. B65B 13/181 (2013.01); B25F 1/00 (2013.01)
 USPC ............................................................ 410/99

(58) Field of Classification Search
 USPC ............... 410/98, 99; 16/111.1; 294/210, 211
 See application file for complete search history.

(56) References Cited

U.S. PATENT DOCUMENTS

| | | | | |
|---|---|---|---|---|
| 3,424,077 A | * | 1/1969 | De Haan | 100/2 |
| 3,469,878 A | * | 9/1969 | De Haan | 294/210 |
| 3,863,289 A | * | 2/1975 | Whittaker | 15/228 |
| 3,936,088 A | * | 2/1976 | Williams | 294/175 |
| 4,611,512 A | * | 9/1986 | Honda | 81/53.1 |
| 4,801,166 A | * | 1/1989 | Jordan et al. | 294/9 |
| D342,198 S | * | 12/1993 | Zamarripa | D8/14 |
| 5,385,435 A | * | 1/1995 | Musta | 410/102 |
| 5,454,611 A | * | 10/1995 | Wanat | 294/24 |
| 6,729,358 B1 | * | 5/2004 | Moffatt | 140/118 |
| 6,820,906 B1 | | 11/2004 | McClendon | |
| 6,827,379 B2 | * | 12/2004 | Hill et al. | 294/211 |
| D545,648 S | * | 7/2007 | Pulling et al. | D8/14 |
| 7,393,031 B2 | | 7/2008 | Goulet | |
| 7,900,985 B2 | | 3/2011 | Goodfellow et al. | |
| 8,641,110 B1 | * | 2/2014 | Perry | 294/24 |

* cited by examiner

*Primary Examiner* — H Gutman

(57) ABSTRACT

A strap corner protector multifunctional installation tool may include a plate having a front side, a rear side, a top end and a bottom end. The plate may be bent into a J-shape with a curved section ending in front of the front side of the plate. At least two upper posts may be attached to the top end of the plate. At least one lower post may be attached to the bottom end of the plate. At least two back posts may be attached to the rear side of the plate. A threaded protrusion may be attached to the bottom end of the plate. A pole may be connected to the strap corner protector multifunctional installation tool. Various accessories for securing cargo may be installed and positioned through the use of the strap corner protector multifunctional installation tool.

10 Claims, 4 Drawing Sheets

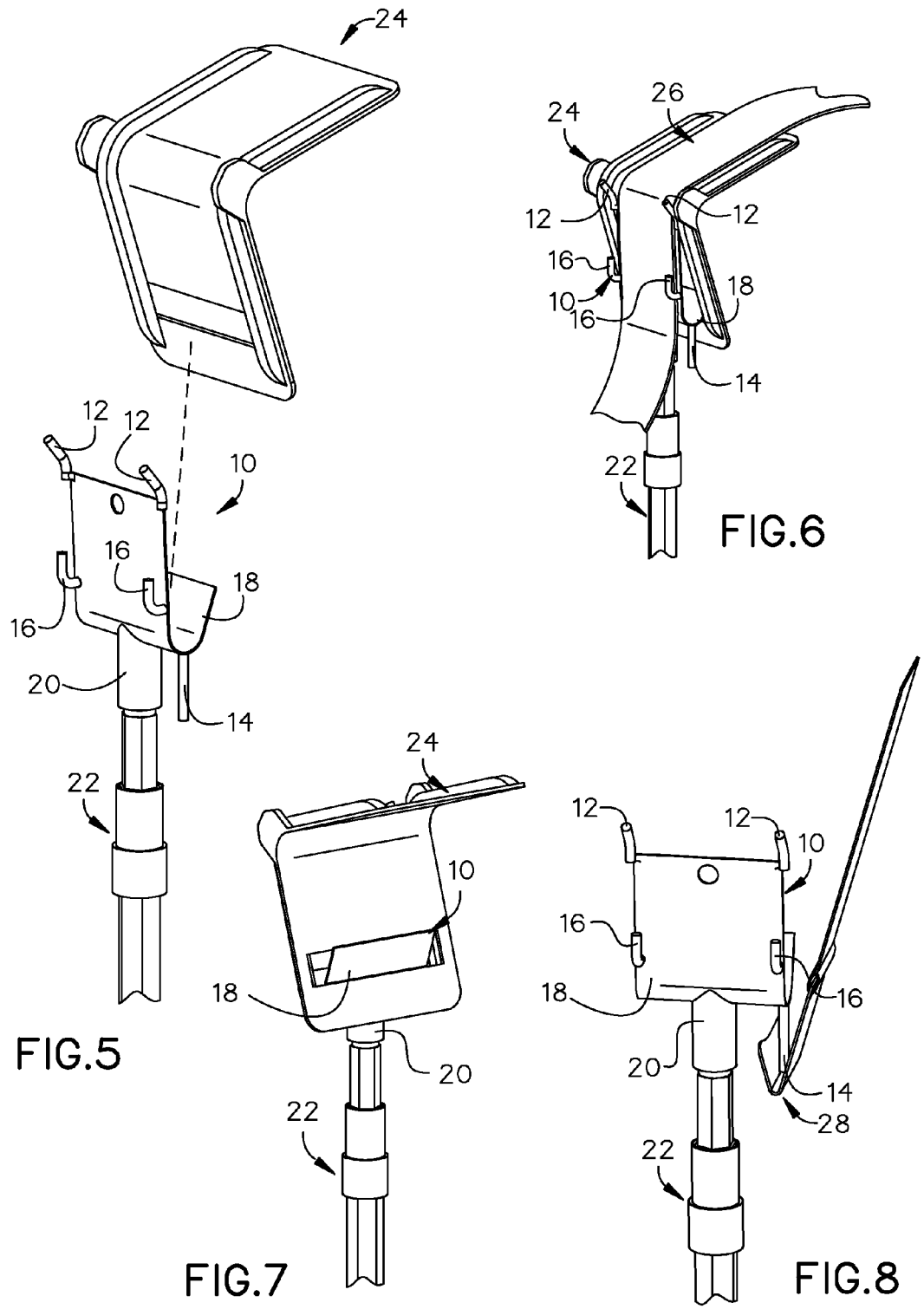

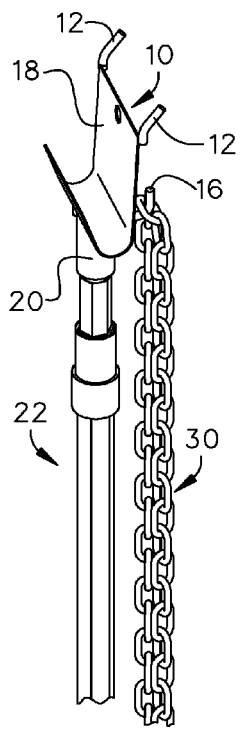
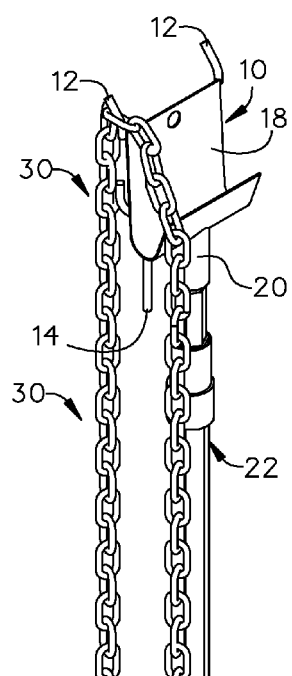
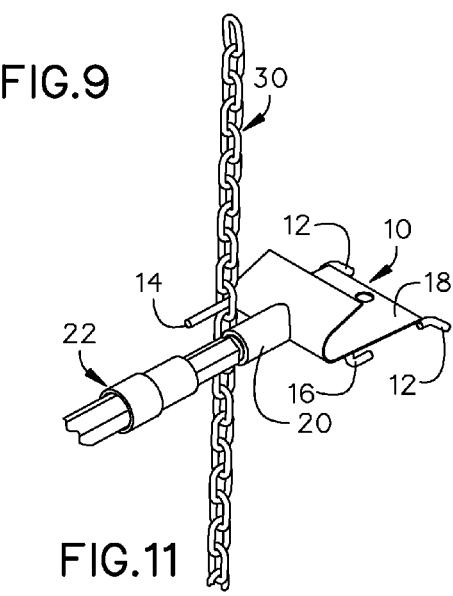
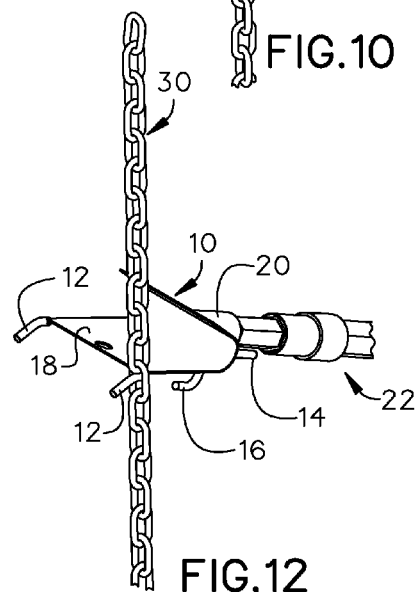
FIG. 9
FIG. 10
FIG. 11
FIG. 12

STRAP CORNER PROTECTOR MULTIFUNCTIONAL INSTALLATION TOOL

CROSS-REFERENCE TO RELATED APPLICATION

This application claims the benefit of U.S. provisional application No. 61/813,020, filed Apr. 17, 2013, the contents of which are herein incorporated by reference.

BACKGROUND OF THE INVENTION

The present invention relates to strap corner protectors and, more particularly, to a strap corner protector multifunctional installation tool.

Currently, an operator has to scale or climb on top of cargo or load in a flatbed trailer to install strap corner protectors and accessories on high and hard to reach locations. These strap corner protectors are time consuming to place in position and the process of installing is unsecured and is a source of accidents. Many times, ladders are required to complete the installation.

As can be seen, there is a need for a strap corner protector multifunctional installation tool that allows for an operator to easily place, with precision and speed, the accessories used for securing cargo from a ground level.

SUMMARY OF THE INVENTION

In one aspect of the present invention, a strap corner protector multifunctional installation tool comprises: a plate having a front side, a rear side, a top end and a bottom end, wherein the plate is bent into a J-shape with a curved section ending in front of the front side of the plate; at least two upper posts attached to the top end of the plate; at least one lower post attached to the bottom end of the plate; at least two back posts attached to the rear side of the plate; and a threaded protrusion attached to the bottom end of the plate.

In another aspect of the present invention, a method for installing a corner protector accessory using a curved section of a tool comprises: removably securing an object on a strap corner protector multifunctional installation tool, wherein the strap corner protector multifunctional installation tool is defined by plate having a front side, a rear side, a top end and a bottom end, wherein the plate is bent into a J-shape with a curve along the front side of the plate; at least two upper posts attached to the top end of the plate; at least one lower post attached to the bottom end of the plate; at least two back posts attached to the rear side of the plate; and a threaded protrusion attached to the bottom end of the plate; directing the object to a proper location with the movement of the strap corner protector multifunctional installation tool; and securing the positioning of the object to the proper location.

These and other features, aspects and advantages of the present invention will become better understood with reference to the following drawings, description and claims.

BRIEF DESCRIPTION OF THE DRAWINGS

FIG. 5 is an exploded view of an exemplary embodiment of the present invention shown in pre-interface configuration with a corner protector;

FIG. 6 is a rear perspective view of an exemplary embodiment of the present invention shown in conjunction with the corner protector and a strap;

FIG. 7 is a front perspective view of an exemplary embodiment of the present invention shown with the corner protector omitting the strap for illustrative clarity;

FIG. 8 is a rear perspective view of an exemplary embodiment of the present invention shown interfacing with a hook;

FIG. 9 is a front perspective view of an exemplary embodiment of the present invention shown interfacing with a chain;

FIG. 10 is a front perspective view of an exemplary embodiment of the present invention shown interfacing with the chain;

FIG. 11 is a front perspective view of an exemplary embodiment of the present invention shown interfacing with the chain;

FIG. 12 is a front perspective view of an exemplary embodiment of the present invention shown interfacing with the chain;

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a strap corner protector multifunctional installation tool that may include a plate having a front side, a rear side, a top end and a bottom end. The plate may be bent into a J-shape with a curved section ending in front of the front side of the plate. At least two upper posts may be attached to the top end of the plate. At least one lower post may be attached to the bottom end of the plate. At least two back posts may be attached to the rear side of the plate. A threaded protrusion may be attached to the bottom end of the plate. A pole may be connected to the strap corner protector multifunctional installation tool. Various accessories for securing cargo may be installed and positioned through the use of the strap corner protector multifunctional installation tool.

Figure 1:
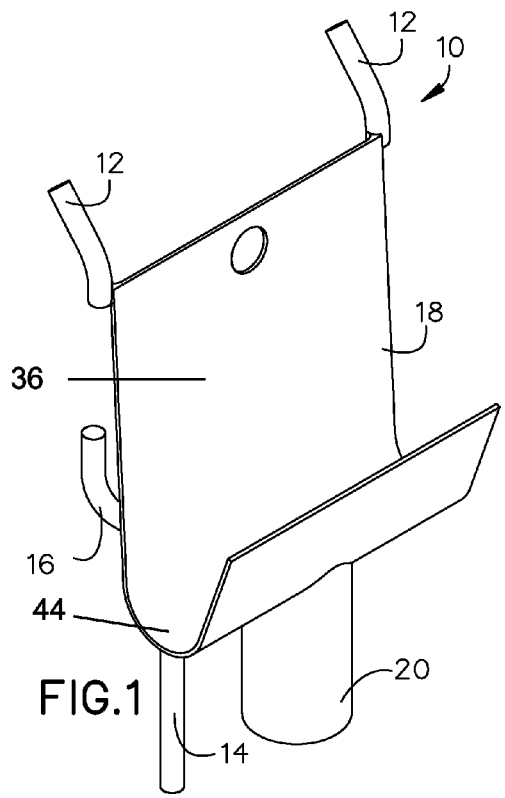
FIG. 1 is a top perspective view of an exemplary embodiment of the invention.
Figure 2:
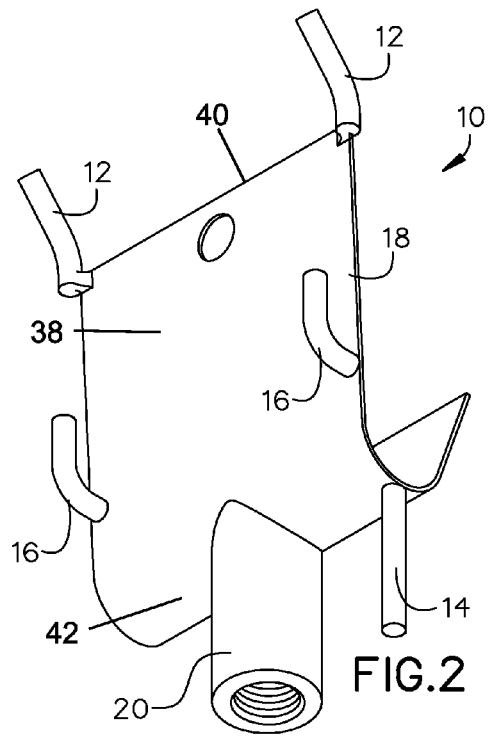
FIG. 2 is a bottom perspective view of an exemplary embodiment of the present invention.
Figure 3:
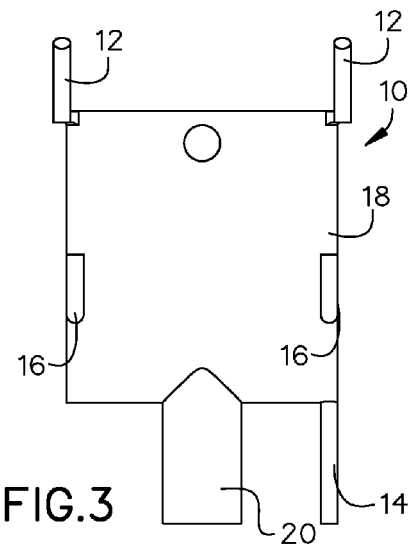
FIG. 3 is a rear view of an exemplary embodiment of the present invention.
Figure 4:
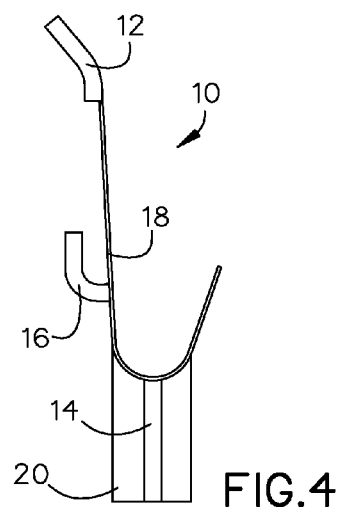
FIG. 4 is a side view of an exemplary embodiment of the present invention.
Figure 13:
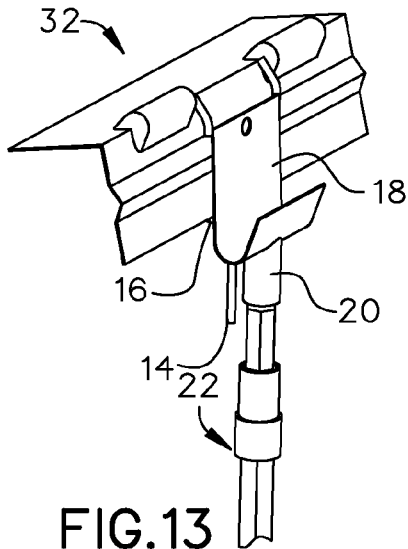
FIG. 13 is a front perspective view of an exemplary embodiment of the present invention shown interfacing with a long strap protector.
Figure 14:
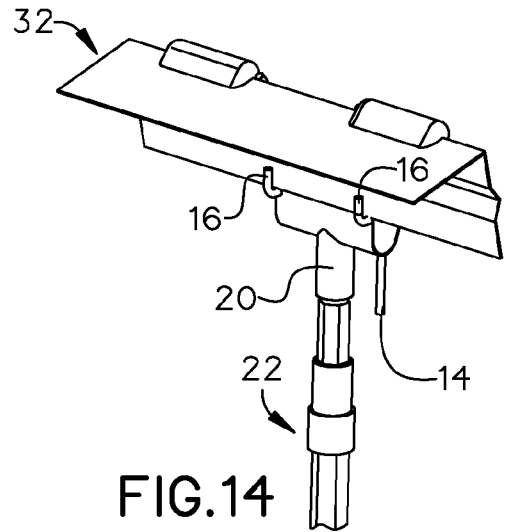
FIG. 14 is a rear perspective view of an exemplary embodiment of the present invention shown interfacing with the long strap protector.
Figure 15:
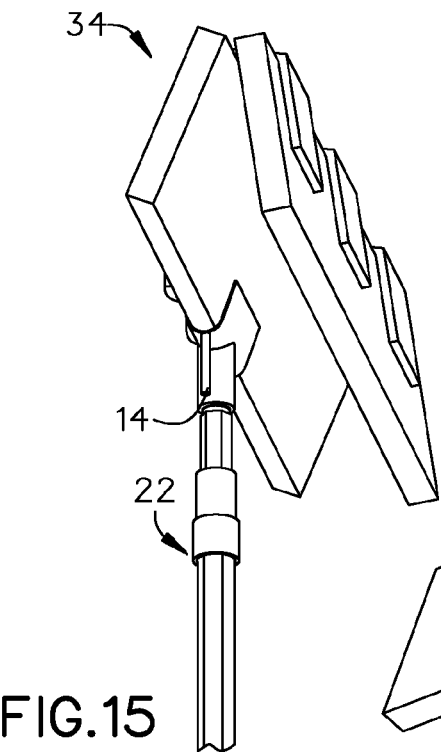
FIG. 15 is a front perspective view of an exemplary embodiment of the present invention shown interfacing a plank board assembly.
Figure 16:
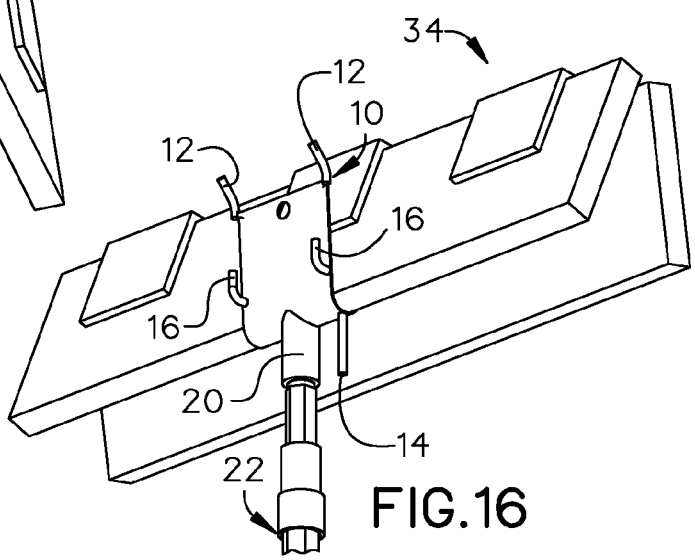
FIG. 16 is a rear perspective view of an exemplary embodiment of the present invention shown interfacing the plank board assembly

As is illustrated in FIGS. 1 through 16, the strap corner protector installation tool 10 may include a plate 18. The plate 18 may have a front side 36, a rear side 38, a top end 40 and a bottom end 42. The plate 18 may be bent in a J-shape with a curved section 44 ending in front of the front side 36 of the plate 18. At least two upper posts 12 may be attached to the top end 40 of the plate 18. In certain embodiments, the at least two upper posts 12 may be angled back away from the rear side 38 of the plate 18. At least one lower post 14 may be attached to the bottom end 42 of the plate 18. In certain embodiments, the at least one lower post 14 may be positioned along one side of the bottom end 42 of the plate 18. At least two back posts 16 may be attached to the rear side 38 of the plate 18. The at least two back posts 16 may be J-shaped. The at least two upper posts 12, the at least one lower post 14, and the at least two back posts 16 may all be included in the term post. A threaded protrusion 20 may be attached to the bottom end 42 of the plate 18. In certain embodiments, the threaded protrusion 20 may be approximately centrally located along the bottom end 42 of the plate 18. The length of the threaded protrusion 20 and the length of the at least one lower post 14 may be approximately the same. In certain embodiments, a pole 22 may be attached to the threaded protrusion 20 on the bottom end 42 of the plate 18. In certain embodiments, the pole 22 may be telescopic. The pole 22 may attach to the threaded protrusion 20 by screwing the pole 22 into the threaded protrusion 20.

A method of making the strap corner protector installation tool 10 may include the following. The plate 18 may be cut out of a cold rolled steel sheet. A hole may be drilled into the plate 18. The sheet may be bent into a J-shape. In certain embodiments, the plate 18 may be approximately six inches long by approximately 3.75 inches wide. The upper posts 12, the lower post 14 and the back posts 16 may be cut from solid round rods. The threaded protrusion 20 may have a female thread along an interior housing. All components may be welded together. Sharp edges may be removed. The strap corner protector installation tool 10 may be made from aluminum, galvanized steel, stainless steel, plastic or the like.

A method of using the strap corner protector installation tool 10 may include the following. An object such as a corner protector 24 may be removably secured into the strap corner protector installation tool 10. An opening in the corner protector 24 may be placed and removably secured within the curved section 44 of the plate 18. A curved section of the corner protector 24 may extend out from the front side 36 of the plate 18. A strap 26 may be held and may slide up the rear side 38 of the plate 18 in between the at least two back posts 16 and between the at least two upper posts 12 and over along the corner protector 24 extending out from the front side 36 of the plate 18. As the strap 26 may be moved, the precision of the location may remain intact through the upper posts 12 and the back posts 16. A person may then direct the corner protector 24 to a proper location. Once the corner protector 24 may be in position, the strap corner protector installation tool 10 may be removed by holding the strap 26 and pulling down on the strap corner protector installation tool 10. The corner protector 24 may stay in position at this time.

For longer straps 26, an object such as a long strap protector 32 may be installed using the rear side 38 of the plate 18. The long strap protector 32 may be removably secured in the strap corner protector installation tool 10. A curved section of the long strap protector 32 may face out from the rear side 38 of the plate 18. A lip of the long strap protector 32 may be placed in the space between the back posts 16 and the rear side 38 of the plate 18. The long strap protector 32 may be additionally secured in position along the strap corner protector installation tool 10 by the upper posts 12. The strap 26 may be placed over the long strap protector 32. A person may then direct the long strap protector 32 to a proper location. Once the long strap protector 32 may be in position, the strap corner protector installation tool 10 may be removed by holding the strap 26 and pulling down on the strap corner protector installation tool 10. The long strap protector 32 may stay in position at this time.

In certain embodiments, the strap corner protector installation tool 10 may be used to route an object such as a tying chain 30. As is shown in FIGS. 9 through 12, the tying chain 30 may be removably secured by the strap corner protector installation tool 10. The tying chain 30 may be placed on any of the upper posts 12, the lower post 14, or the back posts 16. The lengths of the upper posts 12, the lower post 14 and the back posts 16 are long enough so that the tying chain 30 may be removably secured in position along the strap corner protector installation tool 10 while in motion. The tying chain 30 may be moved to a position required. The strap corner protector installation tool 10 may be pulled to provide tension on the tying chain 30, rope or the like.

In certain embodiments, the strap corner protector installation tool 10 may be used for a short throw. An object such as a hook 28 attached to the end of a strap 26 may be placed on the lower post 14. The strap corner protector installation tool 10 may be pulled which may pull down the hook 28 towards the user requiring no additional throws.

In certain embodiments, the strap corner protector installation tool 10 may be used to insert an object such as a plank board assembly 34. A center point of the plank board assembly 34 may be aligned with a center point of the strap corner protector installation tool 10 and be removably secured. The plank board assembly 34 may be placed within the curve along the front side 36 of the plate 18. The plank board assembly 34 may face out away from the strap corner protector installation tool 10. A person may then direct the plank board assembly 34 to a proper location. The plank board assembly 34 may be removed by raising the strap corner protector installation tool 10 above the area it was located and pulling the strap corner protector installation tool 10 and plank board assembly 34 away from the cargo.

It should be understood, of course, that the foregoing relates to exemplary embodiments of the invention and that modifications may be made without departing from the spirit and scope of the invention as set forth in the following claims.

What is claimed is:

1. A strap corner protector multifunctional installation tool comprising:
   a plate having a front side, a rear side, a top end and a bottom end, wherein the plate is bent into a J-shape with a curved section ending in front of the front side of the plate;
   at least two upper posts attached to the top end of the plate;
   at least one lower post attached to the bottom end of the plate;
   at least two back posts attached to the rear side of the plate; and
   a threaded protrusion attached to the bottom end of the plate.

2. The strap corner protector multifunctional installation tool of claim 1, wherein the at least two back posts are J-shaped.

3. The strap corner protector multifunctional installation tool of claim 1, wherein the at least two upper posts are angled back away from the rear side of the plate.

4. The strap corner protector multifunctional installation tool of claim 1, wherein the at least two upper posts are attached to opposite sides of the top end of the plate.

5. The strap corner protector multifunctional installation tool of claim 1, further comprising a pole attached to the threaded protrusion on the bottom end of the plate.

6. A method for installing an accessory for securing cargo comprising:
   removably securing an object on a strap corner protector multifunctional installation tool, wherein the strap corner protector multifunctional installation tool is defined by plate having a front side, a rear side, a top end and a bottom end, wherein the plate is bent into a J-shape with a curve along the front side of the plate; at least two upper posts attached to the top end of the plate; at least one lower post attached to the bottom end of the plate; at least two back posts attached to the rear side of the plate; and a threaded protrusion attached to the bottom end of the plate;

directing the object to a proper location with the movement of the strap corner protector multifunctional installation tool; and securing the positioning of the object to the proper location.

7. The method of claim 6, further comprising the step of positioning the object so that an open side of the object is facing out away from the strap corner protector multifunctional installation tool.

8. The method of claim 7, further comprising the step of placing a strap over the object and along the strap corner protector multifunctional installation tool, within the space between the upper posts.

9. The method of claim 6, further comprising the step of attaching a pole to the threaded protrusion of the bottom end of the plate.

10. The method of claim 6, further comprising the step of pulling down on the strap corner protector multifunctional installation tool to release the tool from the object in the proper location.

\* \* \* \* \*